(12) United States Patent
Henry et al.

(10) Patent No.: US 12,704,645 B2
(45) Date of Patent: Aug. 11, 2026

(54) CLOCK CALIBRATOR FOR NETWORK DEVICES

(71) Applicant: Cisco Technology, Inc., San Jose, CA (US)

(72) Inventors: Jerome Henry, Pittsboro, NC (US); Peiman Amini, Fremont, CA (US); Ardalan Alizadeh, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 307 days.

(21) Appl. No.: 18/475,839

(22) Filed: Sep. 27, 2023

(65) Prior Publication Data

US 2025/0102683 A1 Mar. 27, 2025

(51) Int. Cl.
*G01S 19/39* (2010.01)
*G01S 19/21* (2010.01)

(52) U.S. Cl.
CPC ............ *G01S 19/396* (2019.08); *G01S 19/21* (2013.01)

(58) Field of Classification Search
CPC .......... H04J 3/0638; H04J 3/0655; H04J 3/14; H04J 3/0667; H04J 3/0685; H04J 3/0661; H04J 3/0647; H04J 3/0658; H04J 3/0644; H04W 56/001; H04W 56/004; H04W 64/00; H04W 84/12; H04W 56/003; H04W 88/08; H04W 64/003; H04W 56/0025; H04W 19/05; H04W 19/23; H04W 19/256; H04W 19/235; H04W 19/13; H04W 19/36; H04W 56/0015; H04W 56/0035; H04W 56/0065; H04W 40/244; H04W 4/02; H04W 92/18; H04W 4/80; H04W 4/023;
(Continued)

(56) References Cited

U.S. PATENT DOCUMENTS 8,249,049 B2 * 8/2012 Silverman ......... H04W 56/0075 709/224
2007/0298761 A1 * 12/2007 Bani Hani ............ G01S 19/071 342/357.44

(Continued)

FOREIGN PATENT DOCUMENTS

CN 115022802 A 9/2022
CN 115225190 A 10/2022

(Continued)

*Primary Examiner* — Olumide Ajibade Akonai
(74) *Attorney, Agent, or Firm* — Rutan & Tucker, LLP; Ravi Mohan; Marc A. McClain

(57) ABSTRACT

Devices, systems, methods, and processes for calibrating clock signals of network devices are described herein. A device can initiate a ranging procedure with a reference device for synchronizing a clock signal of the device. The ranging procedure may utilize Fine Time Measurement (FTM), Ultra-Wide band (UWB), or similar protocols. The device can also synchronize the clock signal based on detection of ambient interference events. The device may also receive Global Navigation Satellite System (GNSS) data from a satellite and determine a pseudo range for the corresponding satellite based on the synchronized clock signal. The device may further transmit the GNSS data to a location engine. The location engine may aggregate the GNSS data received from a plurality of devices and determine a geolocation of the plurality of devices based on the aggregated GNSS data.

20 Claims, 9 Drawing Sheets

(58) Field of Classification Search
CPC ........ H04W 56/002; G01S 1/04; G01S 11/02; G01S 5/021; G01S 19/235; G01S 13/765; G01S 5/14; G01S 11/08; G01S 5/02216; H04L 27/2613; H04L 9/3297
See application file for complete search history.

(56) References Cited

U.S. PATENT DOCUMENTS

| | | | | |
|---|---|---|---|---|
| 2009/0133091 | A1* | 5/2009 | Rofougaran | H04N 21/426 725/133 |
| 2011/0035511 | A1* | 2/2011 | Biederman | G04G 7/00 709/248 |
| 2011/0255528 | A1* | 10/2011 | Zakrzewski | H04W 56/009 370/350 |
| 2012/0075439 | A1* | 3/2012 | Gong | H04N 13/239 348/500 |
| 2012/0159001 | A1* | 6/2012 | Liu | H04L 69/02 709/248 |
| 2012/0177027 | A1 | 7/2012 | Venkatraman et al. | |
| 2012/0229334 | A1 | 9/2012 | Waters et al. | |
| 2022/0303776 | A1* | 9/2022 | Beaudin | H04L 63/0876 |
| 2022/0338141 | A1* | 10/2022 | Singh | H04W 56/003 |
| 2023/0171013 | A1* | 6/2023 | Bedrosian | H04J 3/0661 370/350 |

FOREIGN PATENT DOCUMENTS

| | | | | |
|---|---|---|---|---|
| EP | 2244098 | A1 * | 10/2010 | G01S 5/14 |
| KR | 20170095234 | A * | 8/2017 | H04J 3/0667 |
| WO | 2012093249 | A1 | 7/2012 | |

* cited by examiner 310
310
335
335
335
335
335
AP
AP
AP
AP
AP
WLC
330
320
COMMUNICATION NETWORK
340
380
350
350
350
390
360
370
325
300

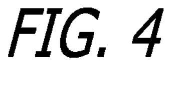

400

TRANSMIT A RANGING REQUEST — 410

RECEIVE A FIRST TIMESTAMP, A SECOND TIMESTAMP, AND A TIMER VALUE FROM A FIRST NETWORK DEVICE IN RESPONSE TO THE RANGING REQUEST — 420

DETERMINE A CLOCK OFFSET BASED ON A DIFFERENCE BETWEEN THE FIRST TIMESTAMP AND THE SECOND TIMESTAMP — 430

DETERMINE A CLOCK DRIFT BASED ON THE CLOCK OFFSET AND THE TIMER VALUE — 440

CALIBRATE A CLOCK SIGNAL BASED ON THE CLOCK DRIFT AND THE CLOCK OFFSET — 450

500
RECEIVE A FIRST SATELLITE SIGNAL CORRESPONDING TO A FIRST SATELLITE
510
DETERMINE A FIRST PSEUDO RANGE TO THE FIRST SATELLITE BASED ON THE FIRST SATELLITE SIGNAL AND THE CLOCK SIGNAL
520
RECEIVE A SECOND PSEUDO RANGE FROM THE FIRST NETWORK DEVICE
530
DETERMINE A GEOLOCATION BASED ON THE FIRST PSEUDO RANGE, SECOND PSEUDO RANGE, AND CLOCK SIGNAL
540

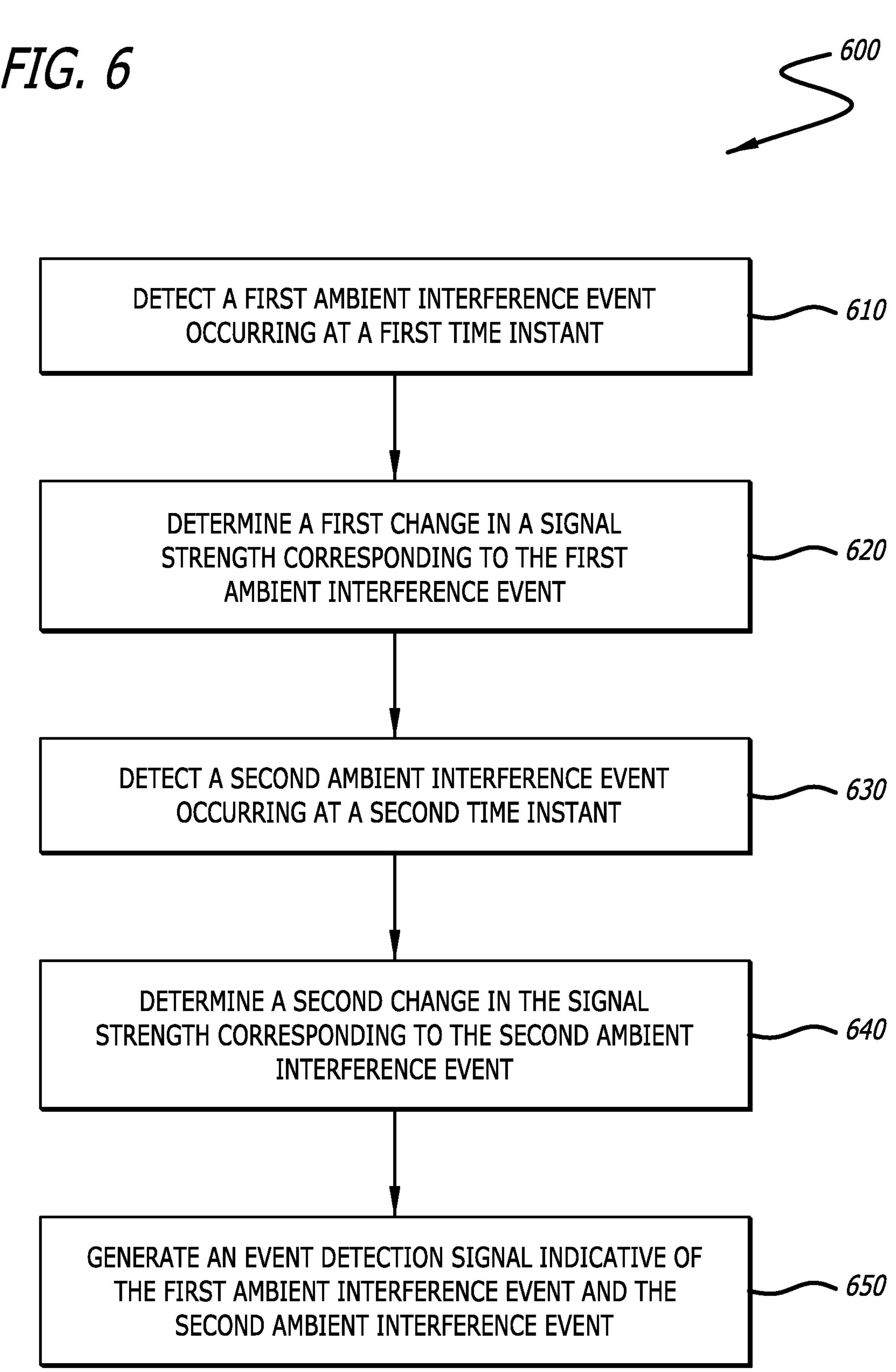
FIG. 6
600
DETECT A FIRST AMBIENT INTERFERENCE EVENT OCCURRING AT A FIRST TIME INSTANT
610
DETERMINE A FIRST CHANGE IN A SIGNAL STRENGTH CORRESPONDING TO THE FIRST AMBIENT INTERFERENCE EVENT
620
DETECT A SECOND AMBIENT INTERFERENCE EVENT OCCURRING AT A SECOND TIME INSTANT
630
DETERMINE A SECOND CHANGE IN THE SIGNAL STRENGTH CORRESPONDING TO THE SECOND AMBIENT INTERFERENCE EVENT
640
GENERATE AN EVENT DETECTION SIGNAL INDICATIVE OF THE FIRST AMBIENT INTERFERENCE EVENT AND THE SECOND AMBIENT INTERFERENCE EVENT
650

RECEIVE AN EVENT DETECTION SIGNAL INDICATIVE OF A FIRST AMBIENT INTERFERENCE EVENT AND A SECOND AMBIENT INTERFERENCE EVENT — 710

DETERMINE A FIRST CHANGE IN SIGNAL STRENGTH CORRESPONDING TO THE FIRST AMBIENT INTERFERENCE EVENT OCCURRING AT A FIRST TIME INSTANT BASED ON THE EVENT DETECTION SIGNAL — 720

DETERMINE A SECOND CHANGE IN SIGNAL STRENGTH CORRESPONDING TO THE SECOND AMBIENT INTERFERENCE EVENT OCCURRING AT A SECOND TIME INSTANT BASED ON THE EVENT DETECTION SIGNAL — 730

DETERMINE A DIFFERENCE BETWEEN THE FIRST TIME INSTANT AND THE SECOND TIME INSTANT — 740

DETERMINE THE CLOCK DRIFT BASED ON THE DIFFERENCE — 750

800
RECEIVE A RANGING REQUEST FROM A NETWORK DEVICE
810
TRANSMIT AN ACKNOWLEDGEMENT TO THE RANGING REQUEST
820
TRANSMIT A FIRST RANGING SIGNAL INCLUDING A FIRST TIMESTAMP
830
RECEIVE AN ACKNOWLEDGEMENT TO THE FIRST RANGING SIGNAL
840
TRANSMIT A SECOND RANGING SIGNAL INCLUDING A SECOND TIMESTAMP
850
RECEIVE AN ACKNOWLEDGEMENT TO THE SECOND RANGING SIGNAL
860

FIG. 9

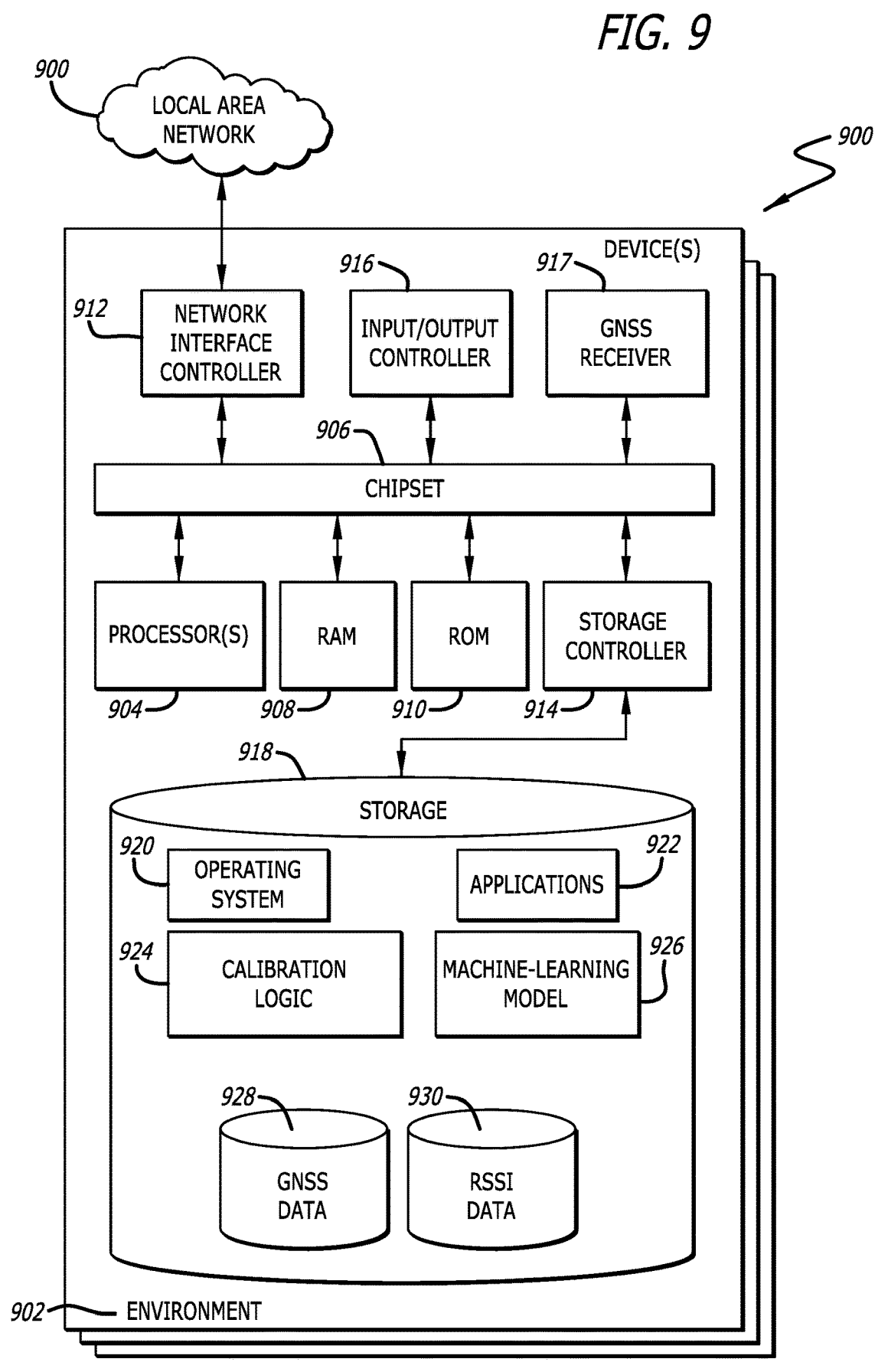

900
LOCAL AREA NETWORK
900
DEVICE(S)
912
NETWORK INTERFACE CONTROLLER
916
INPUT/OUTPUT CONTROLLER
917
GNSS RECEIVER
906
CHIPSET
PROCESSOR(S)
904
RAM
908
ROM
910
STORAGE CONTROLLER
914
918
STORAGE
920
OPERATING SYSTEM
APPLICATIONS
922
924
CALIBRATION LOGIC
MACHINE-LEARNING MODEL
926
928
GNSS DATA
930
RSSI DATA
902
ENVIRONMENT

CLOCK CALIBRATOR FOR NETWORK DEVICES

The present disclosure relates to communication networks. More particularly, the present disclosure relates to calibrating a clock signal of a device in a communication network.

BACKGROUND

Integration of Global Navigation Satellite System (GNSS) receivers within modern indoor Access Points (APs) to accurately ascertain their locations poses a number of challenges. This is particularly relevant for the utilization of the 6 GHz Wi-Fi band, where the APs are required to estimate their precise locations to selectively operate in low-power or high-power modes and on selective operating frequencies. Indoor environments often restrict AP visibility to one or two satellites (for example, through windows), resulting in low accuracy of their location. In addition, due to low satellite visibility, the APs are unable to accurately calibrate their internal clocks. Notably, the APs almost always remain stationary. The APs situated across different locations on a floor might collectively have visibility to the necessary five or more satellites. Thus arises the need to synchronize GNSS clocks of the APs within an indoor environment with partial satellite visibility.

The IEEE 1588 protocol facilitates time synchronization among the APs, with reasonable precision. However, the protocol demands two GNSS modules (affixed to separate APs) to transmit synchronization messages over the network for aligning their clocks with a central server. The existing deployments of the protocol encounter multiple network devices along a transmission path that lack support for this protocol, thereby constraining its practicality. Further, given that a GNSS module is connected to an AP, the transmission path of a synchronization message encompasses the GNSS module, an AP host, and an AP Ethernet interface of a first AP, then via the communication network, and finally via Ethernet interface, an AP host, and a GNSS module of a second AP. This convoluted pathway introduces stochastic elements that limit the synchronization possibilities.

SUMMARY OF THE DISCLOSURE

Systems and methods for calibrating a clock signal of a device in a communication network in accordance with embodiments of the disclosure are described herein. In some embodiments, a device, includes a processor, a memory communicatively coupled to the processor, and a calibration logic. The logic is configured to transmit a ranging request, receive a first timestamp, a second timestamp, and a timer value from a first network device in response to the ranging request, determine a clock offset based on a difference between the first timestamp and the second timestamp, determine a clock drift based on the clock offset and the timer value, and calibrate a clock signal based on the clock drift and the clock offset.

In some embodiments, at least one global navigation satellite system (GNSS) receiver configured to receive a first satellite signal corresponding to a first satellite.

In some embodiments, the calibration logic is further configured to determine a first pseudo range to the first satellite based on the first satellite signal and the clock signal, and determine a geolocation of the device based on the first pseudo range.

In some embodiments, the calibration logic is further configured to receive a second pseudo range from the first network device, and determine a geolocation of the first network device based on the second pseudo range and the clock signal.

In some embodiments, the calibration logic is further configured to detect a first ambient interference event occurring at a first time instant, determine a first change in a signal strength corresponding to the first ambient interference event, detect a second ambient interference event occurring at a second time instant, determine a second change in the signal strength corresponding to the second ambient interference event, and generate an event detection signal indicative of the first ambient interference event and the second ambient interference event.

In some embodiments, the calibration logic is further configured to receive an event detection signal indicative of a first ambient interference event and a second ambient interference event, determine a first change in signal strength corresponding to the first ambient interference event occurring at a first time instant based on the event detection signal, determine a second change in signal strength corresponding to the second ambient interference event occurring at a second time instant based on the event detection signal, and determine the clock drift based on a difference between the first time instant and the second time instant.

In some embodiments, the ranging request includes at least one of a fine time measurement (FTM) ranging request or an ultra-wide band (UWB) ranging request.

In some embodiments, a device includes a processor, a memory communicatively coupled to the processor, and a calibration logic. The logic is configured to receive a plurality of ranging requests from a plurality of network devices, and transmit a plurality of responses to the plurality of network devices, wherein the plurality of network devices synchronizes corresponding clock signals with a reference clock signal of the device based on corresponding responses.

In some embodiments, the calibration logic is further configured to receive one or more pseudo ranges from the plurality of network devices, and determine a geolocation of the plurality of network devices based on the one or more pseudo ranges and the reference clock signal.

In some embodiments, at least one global navigation satellite system (GNSS) receiver configured to receive a first satellite signal corresponding to a first satellite.

In some embodiments, the calibration logic is further configured to determine a first pseudo range to the first satellite based on the first satellite signal, and determine a geolocation of the device based on the first pseudo range.

In some embodiments, each response includes a first timestamp, a second timestamp, and a timer value.

In some embodiments, each network device of the plurality of network devices determines a clock offset based on a difference between the first timestamp and the second timestamp, and a clock drift based on the clock offset and the timer value.

In some embodiments, each network device of the plurality of network devices synchronizes corresponding clock signal with the reference clock signal of the device based on the clock drift and the clock offset.

In some embodiments, each ranging request includes at least one of a fine time measurement (FTM) ranging request or an ultra-wide band (UWB) ranging request.

In some embodiments, the calibration logic is further configured to detect a first ambient interference event occurring at a first time instant, determine a first change in a signal strength corresponding to the first ambient interference event, detect a second ambient interference event occurring at a second time instant, determine a second change in the signal strength corresponding to the second ambient interference event, and generate an event detection signal indicative of the first ambient interference event and the second ambient interference event.

In some embodiments, each network device of the plurality of network devices receives the event detection signal and synchronizes corresponding clock signal with the reference clock signal based on the event detection signal.

In some embodiments, a method includes initiating a ranging procedure, receiving a first timestamp, a second timestamp, and a timer value from a first network device in response to a ranging procedure, determining a clock offset based on a difference between the first timestamp and the second timestamp, determining a clock drift based on the clock offset and the timer value, and calibrating a clock signal based on the clock drift and the clock offset.

In some embodiments, the method further includes receiving a first satellite signal corresponding to a first satellite, determining a first pseudo range to the first satellite based on the first satellite signal and the clock signal, and determining a geolocation based on the first pseudo range and the clock signal.

In some embodiments, the method further includes receiving an event detection signal indicative of a first ambient interference event and a second ambient interface event, and calibrating the clock signal based on the event detection signal.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 4 is a flowchart depicting a process for calibrating a clock signal of a device, in accordance with various embodiments of the disclosure;

FIG. 6 is a flowchart depicting a process for detecting one or more ambient events and generating an event detection signal, in accordance with various embodiments of the disclosure;

FIG. 7 is a flowchart depicting a process for determining a clock drift, in accordance with various embodiments of the disclosure;

FIG. 9 is a conceptual block diagram of a device suitable for configuration with a calibration logic, in accordance with various embodiments of the disclosure.

Figure 1:
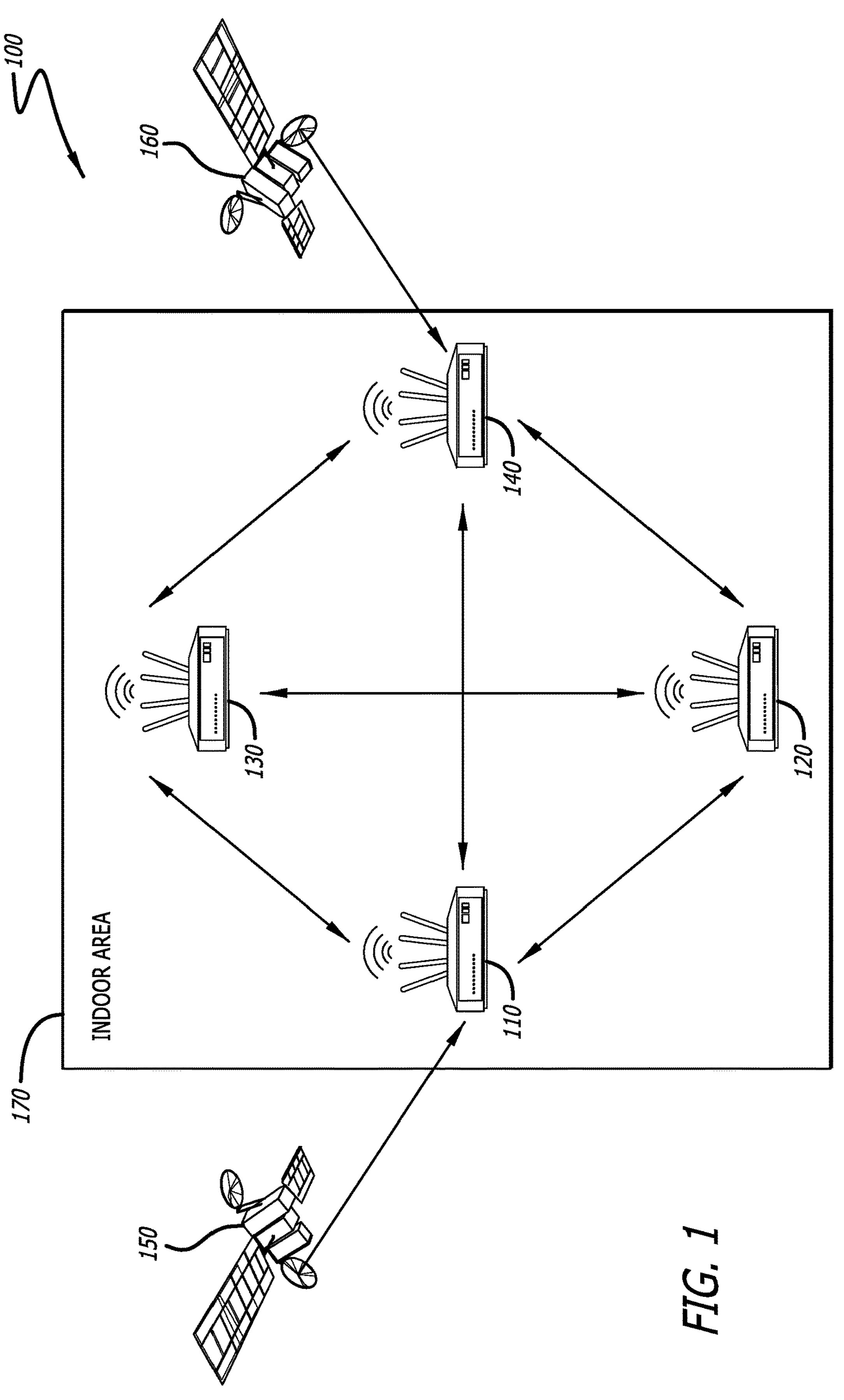
FIG. 1 is a conceptual illustration of a plurality of devices and a plurality of satellites, in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that calibrate a clock signal of a device. In many embodiments, a plurality of devices may be placed in indoor or partially indoor regions. Each device can have visibility to one or more satellites. Each device may also have visibility to a different set of satellites. The plurality of devices can be interconnected by way of a communication network. The communication network may be a wired network or a wireless network. Each device can include one or more radios configured to communicate on one or more operating frequencies. The device may also include a Global Navigation Satellite System (GNSS) receiver to receive GNSS data and satellite signals from the satellites. The GNSS receiver may be directly connected to the radios of the device, thereby enabling communication between the GNSS receiver and the radios without delay. The device can operate on a clock signal. Since every device can operate on corresponding clock signal, the clock signals of the devices may not be initially synchronized. A calibration logic can calibrate the clock signal of the device. The device may transmit a ranging request to a first network device. The device may use a Finite Time Measurement (FTM) protocol or an Ultra-wideband (UWB) based communication protocol. The device can receive a first timestamp, a second timestamp, and a timer value from the first network device in response to the ranging request. The device can determine a difference between the first timestamp and the second timestamp. The device may compare the difference between the first timestamp and the second timestamp with a difference of time observed by the device by utilizing the clock signal of the device. The device can determine a clock offset based on the time difference. The device may also determine a clock drift based on the clock offset and the timer value. The device can further calibrate the clock signal based on the clock drift and the clock offset.

In various embodiments, the GNSS receiver may receive a first satellite signal from a first satellite. The device can determine a first pseudo range to the first satellite based at least on the first satellite signal and the clock signal. In some embodiments, the device may determine a geolocation of the device based at least on the first pseudo range. The device can further receive a second pseudo range from the first network device. In certain embodiments, the device may determine the geolocation of the first network device based at least on the first pseudo range and the second pseudo range. In some more embodiments, the device and the first network device can be in close proximity, and hence, the geolocation of the device and the geolocation of the first network device may be the same.

In a number of embodiments, the device can detect a first ambient interference event occurring in a vicinity of the device. The first ambient interference event may occur at a first time instant. The first ambient interference event can affect strength of signals received by the device. The device may determine a first change in signal strength corresponding to the first ambient interference event. Similarly, the device can detect a second ambient interference event occurring in the vicinity of the device. The second ambient interference event may occur at a second time instant. The second ambient interference event can also affect the strength of signals received by the device. The device may determine a second change in signal strength corresponding to the second ambient interference event. The device can generate an event detection signal indicative of the first ambient interference event and the second ambient interference event.

In additional embodiments, the first network device can receive the event detection signal indicative of the first ambient interference event and the second ambient interference event. The first network device may determine the first change in signal strength corresponding to the first ambient interference event occurring at the first time instant based on the event detection signal. The first network device can also determine the second change in signal strength corresponding to the second ambient interference event occurring at the second time instant based on the event detection signal. The first network device may further determine a time difference between the first time instant and the second time instant. The first network device can further determine an observed time difference between a time of occurrence of the first ambient interference event as observed by the first network device and a time of occurrence of the second ambient interference event as observed by the first network device. In some embodiments, the first network device may initialize a timer at the time of occurrence of the first ambient interference event and reads a timer value at the time of occurrence of the second ambient interference event to calculate the observed time difference. The first network device may compare the time difference determined based on the event detection signal with the observed time difference. The first network device may determine the clock drift based on the comparison. The first network device can calibrate the corresponding clock signal based on the clock drift.

In further embodiments, all network devices, during initialization, may calibrate the respective clock signals with same device. Therefore, all the network devices can be synchronized and hence, can form a synchronized mesh network. In some embodiments, one of the network devices in the mesh network may function as a location engine. The location engine can receive multiple pseudo range measurements from the remaining network devices and can determine the geolocation of the mesh network based on the received pseudo range measurements.

Advantageously, the synchronized mesh network can synchronize the clock signal between the network devices instantaneously and in real-time. This can avoid the delays caused in conventional clock synchronization protocols, provide faster initialization of the network devices at boot-up, and improve the efficiency of the network devices, thereby providing numerous technological advantages over the conventional synchronization techniques. The synchronized mesh network may also enable the location engine to combine the GNSS data received by one or more network devices in the synchronized mesh network to determine the geolocation of the synchronized mesh network and all the network devices therein. Therefore, the location engine can accurately determine the geolocation even if each network device has visibility to less than five GNSS satellites. Based on the geolocation of the synchronized mesh network, the network devices can be configured to selectively operate in low-power or high-power modes and on selective operating frequencies. Consequently, the network devices of the present disclosure can effectively operate in different Wi-Fi bands by automatically selecting an operating frequency and a power mode based on the geolocation of the synchronized mesh network even when all the network devices are located indoors or partially indoors with very limited visibility of the GNSS satellites. As a result, new Wi-Fi bands, such as the 6 GHz band, can be used in locations otherwise unreachable by conventional techniques.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a plurality of devices (110, 120, 130, and 140) and a plurality of satellites (150 and 160), in accordance with various embodiments of the disclosure is shown. In some embodiments, the devices (110, 120, 130, and 140) may include Access Points (APs), routers, switches, modems, servers, or gateways. In certain embodiments, the satellites (150 and 160) may include a global navigation satellite system (GNSS) satellite. In some more embodiments, the GNSS system may include Global Positioning System (GPS), GLObalnaya NAvigatsionnaya Sputnikovaya Sistema (GLONASS), Galileo, BeiDou, or Navigation with Indian Constellation (NavIC) etc. The satellites (150 and 160) may revolve around the earth in a predetermined orbit. Some non-limiting examples of the orbits include geostationary orbits and geosynchronous orbits. The satellites (150 and 160) may be visible to the devices (110, 120, 130, and 140) only for a limited time period and only in a limited part of a sky visible to the devices (110, 120, 130, and 140).

In many embodiments, the devices (110, 120, 130, and 140) may include one or more GNSS receivers to receive satellite signals transmitted by the satellites (150 and 160). A GNSS receiver can receive GNSS data from the satellite on one or more frequency bands. In some non-limiting examples, the frequency bands can be L bands or S bands. The devices (110, 120, 130, and 140) can also store the GNSS data in a memory of the device. In some embodiments, the GNSS data may include one or more of: pseudorandom codes, navigation message, carrier frequency, modulation data, ephemeris data, almanac data, clock corrections, status and health information, encryption and authentication information, or signal strength and quality indicators etc. In certain embodiments, the devices (110, 120, 130, and 140) may be placed in an indoor environment or a partially indoor environment. When the devices (110, 120, 130, and 140) are placed in the indoor environment, the GNSS receivers of the devices (110, 120, 130, and 140) may observe fewer than five satellites. In more embodiments, the devices (110, 120, 130, and 140) may be stationary.

In a number of embodiments, it is essential to determine a geolocation of the devices (110, 120, 130, and 140). As may be understood by a person skilled in the art, different geographical locations, such as different countries, have different regulations that govern operating frequencies and output power on which the devices (110, 120, 130, and 140) should operate. Based on the geolocation of the devices (110, 120, 130, and 140), the devices (110, 120, 130, and 140) may be configured to operate on a predetermined frequency and at a predetermined output power to comply with the regulations of the location. In some embodiments, since each of the devices (110, 120, 130, and 140) may observe different satellites and may operate on different clock signals, it is essential to synchronize the clock signals of the devices. After the clock signals of the devices (110, 120, 130, and 140) may be synchronized, the GNSS data received by the devices (110, 120, 130, and 140) from different satellites can be aggregated to determine the geolocation of the devices (110, 120, 130, and 140). The devices (110, 120, 130, and 140) may be interconnected by way of a communication network in form of a mesh topology.

Although a specific embodiment for the devices (110, 120, 130, and 140) and the satellites (150 and 160) suitable for carrying out the various steps, processes, methods, and operations described herein is discussed with respect to FIG. 1, any of a variety of systems and/or processes may be utilized in accordance with embodiments of the disclosure. In some embodiments, the devices (110, 120, 130, and 140) may synchronize the corresponding clock signals to a reference clock signal. The elements depicted in FIG. 1 may also be interchangeable with other elements of FIGS. 2-9 as required to realize a particularly desired embodiment.

Figure 2:
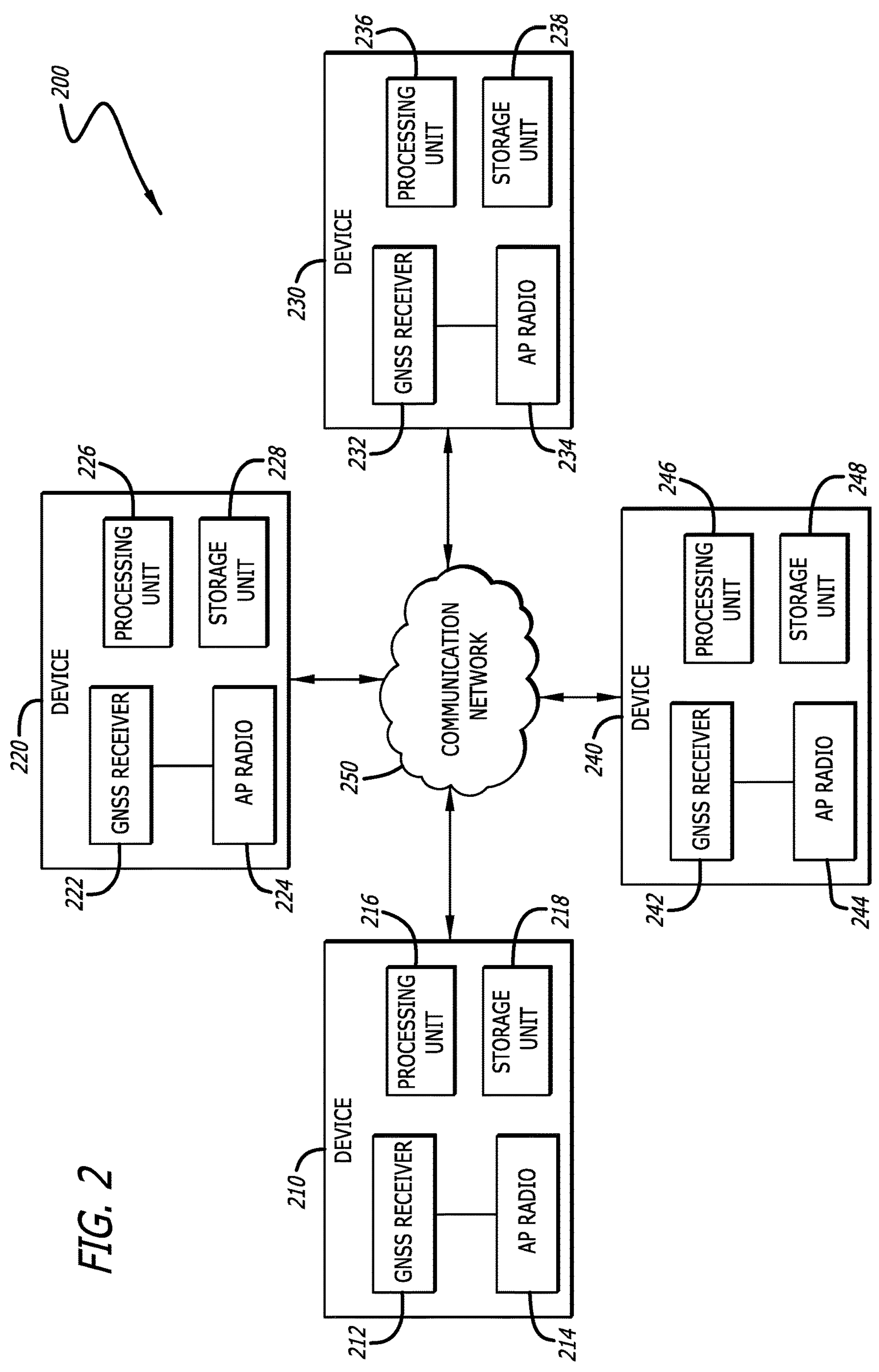
FIG. 2 is a conceptual illustration of a plurality of interconnected devices, in accordance with various embodiments of the disclosure.

Referring to FIG. 2, a conceptual illustration of plurality of interconnected devices (210, 220, 230, and 240), in accordance with various embodiments of the disclosure is shown. In many embodiments, each of the devices (210, 220, 230, and 240) may include a GNSS receiver, an Access Point (AP) radio, a processing unit, and a storage unit. The GNSS receiver may be directly connected to the AP radio to provide instantaneous communication. The device (210) may include a GNSS receiver (212), an AP radio (214), a processing unit (216), and a storage unit (218). The device (220) may include a GNSS receiver (222), an AP radio (224), a processing unit (226), and a storage unit (228). The device (230) may include a GNSS receiver (232), an AP radio (234), a processing unit (236), and a storage unit (238).

In a number of embodiments, the devices (210, 220, 230, and 240) can be interconnected by way of a communication network (250). The communication network (250) may be a wired communication network or a wireless communication network. Each of the devices (210, 220, 230, and 240) can operate on respective clock signals. In some embodiments, one of the devices (210, 220, 230, and 240) may be a reference device. The remaining devices (210, 220, 230, and 240) can synchronize the respective clock signals with the reference clock signal of the reference device. In more embodiments, one of the devices (210, 220, 230, and 240) may include a location engine. The remaining of the devices (210, 220, 230, and 240) can receive the GNSS data from the satellites and transmit the received GNSS data to the location engine. The location engine can receive and aggregate the GNSS data. The location engine may further determine the geolocation of the devices (210, 220, 230, and 240) based on the aggregated GNSS data.

Although a specific embodiment for the interconnected devices (210, 220, 230, and 240) suitable for carrying out the various steps, processes, methods, and operations described herein is discussed with respect to FIG. 2, any of a variety of systems and/or processes may be utilized in accordance with embodiments of the disclosure. In many examples, the devices (210, 220, 230, and 240) may form the mesh network, function as a collection of multiple GNSS receivers, and aggregate the GNSS data received by the devices (210, 220, 230, and 240). The elements depicted in FIG. 1 may also be interchangeable with other elements of FIG. 1 and FIGS. 3-9 as required to realize a particularly desired embodiment.

Figure 3:
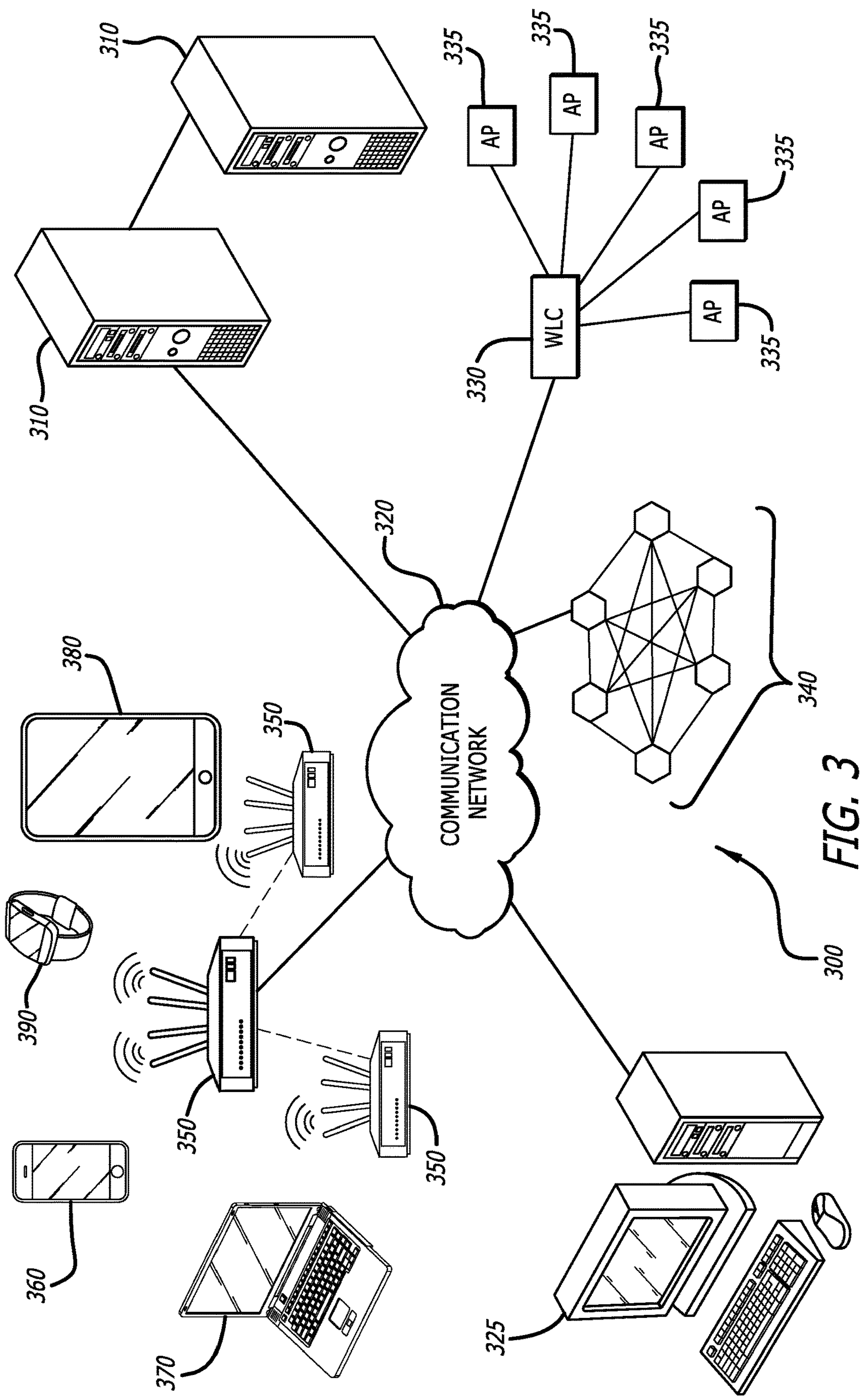
FIG. 3 is a conceptual network diagram of various environments that a clock calibrator may operate on a plurality of network devices, in accordance with various embodiments of the disclosure.

Referring to FIG. 3, a conceptual network diagram 300 of various environments that a clock calibrator may operate on a plurality of network devices, in accordance with various embodiments of the disclosure is shown. Those skilled in the art will recognize that the clock calibrator can be comprised of various hardware and/or software deployments and can be configured in a variety of ways. In many embodiments, the clock calibrator can be configured as a standalone device, exist as a logic in another network device, be distributed among various network devices operating in tandem, or remotely operated as part of a cloud-based network management tool. In further embodiments, one or more servers 310 can be configured with or otherwise operate the clock calibrator. In many embodiments, the clock calibrator may operate on one or more servers 310 connected to a communication network 320. The communication network 320 can include wired networks or wireless networks. In many embodiments, the communication network 320 may be a Wi-Fi network operating on various frequency bands, such as, 2.4 GHz, 5 GHz, or 6 GHz. In some embodiments, the devices connected to the communication network 320 may operate on respective clock signals. In more embodiments, the clock calibrator operating on the servers 310 can synchronize the clocks signals of the devices. The clock calibrator can also determine the geolocation of the devices. The clock calibrator can be provided as a cloud-based service that can service remote networks, such as, but not limited to a deployed network 340. In many embodiments, the clock calibrator can be a logic that can synchronize the clock signals of the devices. In more embodiments, the clock calibrator may be a logic that can aggregate the GNSS data received from the devices. In some more embodiments, the clock calibrator can also be a logic that may determine the geolocation of the devices based on the aggregated GNSS data. In numerous embodiments, the clock calibrator may also be a logic that can synchronize the devices to form a synchronized mesh network.

However, in additional embodiments, the clock calibrator may be operated as a distributed logic across multiple network devices. In the embodiment depicted in FIG. 3, a plurality of network access points (APs) 350 can operate as the clock calibrator in a distributed manner or may have one specific device operate as the clock calibrator for all of the neighboring or sibling APs 350. The APs 350 can synchronize the clock signals of the APs with the reference clock signal. The APs 350 facilitate Wi-Fi connections for various electronic devices, such as but not limited to mobile computing devices including laptop computers 370, cellular phones 360, portable tablet computers 380 and wearable computing devices 390.

In further embodiments, the clock calibrator may be integrated within another network device. In the embodiment depicted in FIG. 3, a wireless LAN controller (WLC) 330 may have an integrated clock calibrator that the WLC 330 can use to synchronize the clock signals of the APs 335 that the WLC 330 is connected to, either wired or wirelessly. In still more embodiments, a personal computer 325 may be utilized to access and/or manage various aspects of the clock calibrator, either remotely or within the network itself. In the embodiment depicted in FIG. 3, the personal computer 325 communicates over the communication network 320 and can access the clock calibrator of the servers 310, or the network APs 350, or the WLC 330.

Although a specific embodiment for various environments that the clock calibrator of may operate on a plurality of network devices suitable for carrying out the various steps, processes, methods, and operations described herein is discussed with respect to FIG. 3, any of a variety of systems and/or processes may be utilized in accordance with embodiments of the disclosure. In many non-limiting examples, the clock calibrator may be provided as a device or software separate from the APs or the clock calibrator may be integrated into the APs 350. The elements depicted in FIG. 3 may also be interchangeable with other elements of FIGS. 1-2 and 4-9 as required to realize a particularly desired embodiment.

Referring now to FIG. 4, a flowchart depicting a process 400 for calibrating the clock signal of the device, in accordance with various embodiments of the disclosure is shown. In many embodiments, the process 400 may transmit a ranging request (block 410). In some embodiments the AP may transmit the ranging request to the reference AP. In certain embodiments, the ranging request can be a Fine Time Measurement (FTM) ranging request, an Ultra-Wide Band (UWB) ranging request, or a similar ranging request.

In a number of embodiments, the process 400 may receive a first timestamp, a second timestamp, and a timer value from a first network device in response to the ranging request (block 420). In some embodiments, process 400 can receive an acknowledgement of the ranging request from the reference AP. In certain embodiments, the process 400 may also receive a first ranging signal from the reference AP. In more embodiments, the first ranging signal can also include the first time stamp. In some more embodiments, the process 400 may transmit an acknowledgement of the first ranging signal to the reference AP. In numerous embodiments, the process 400 can further receive a second ranging signal from the reference AP. In many other embodiments, the process 400 may further transmit an acknowledgement of the second ranging signal to the reference AP. In still more embodiments, the first time stamp may indicate a time when the reference AP transmits the first ranging signal to the AP and the second time stamp may indicate a time when the reference AP receives the acknowledgement of the first ranging signal from the AP. In various additional embodiments, the timer value can be transmitted by the reference AP to the AP to indicate a time when a next frame will be exchanged between the AP and the reference AP.

In various embodiments, the process 400 can determine a clock offset based on a difference between the first timestamp and the second timestamp (block 430). In some embodiments, the time difference between the first timestamp and the second timestamp may indicate a time-of-flight between the AP and the reference AP. In certain embodiments, the time-of-flight can be utilized to determine the clock offset as well as a distance between the AP and the reference AP. In more embodiments, the process 400 may utilize time stamps of each subsequent frame. In some more embodiments, the AP can start a counter at the time of transmitting the ranging request. In numerous embodiments, the AP may compare dynamic values of the counter with the time stamps of each subsequent frames received from the reference AP. In many further embodiments, the difference between the dynamic counter value and the corresponding time stamp of the frame, when adjusted according to the time-of-flight, may be utilized to determine the clock offset of the AP with reference to the reference clock signal of the reference AP. In still more embodiments, when a set of APs synchronize the respective clock signals with the reference clock signal of the reference AP, the set of APs can be synchronized to work in tandem with the reference AP in form of the synchronized mesh network.

In additional embodiments, the process 400 may determine the clock drift based on the clock offset and the timer value (block 440). In some embodiments, the process 400 can observe the time difference between the time stamp of one frame and the time stamp of the next frame. In certain embodiments, the process 400 can determine an observed time difference in the first frame and the second frame as indicated by the clock signal. In more embodiments, the process 400 may compare the time difference of the time stamps with the observed time difference indicated by the clock signal to determine the clock drift.

In further embodiments, the process 400 may calibrate the clock signal based on the clock drift and the clock offset (block 450). In some embodiments, the AP can calibrate the clock signal based on the clock drift and the clock offset to synchronize the clock signal with the reference clock signal of the reference AP. In certain embodiments, all APs in the network may calibrate the respective clock signals to synchronize with the reference clock signal of the reference AP. In more embodiments, after synchronization, all APs can function in tandem as a singular system having multiple GNSS receivers. In some more embodiments, the synchronized mesh network may function as the singular system.

Although a specific embodiment for calibrating the clock signal of the device for carrying out the various steps, processes, methods, and operations described herein is discussed with respect to FIG. 4, any of a variety of systems and/or processes may be utilized in accordance with embodiments of the disclosure. In many non-limiting examples, the process 400 can synchronize all devices in the network to function on the reference clock signal. The elements depicted in FIG. 4 may also be interchangeable with other elements of FIGS. 1-3 and 5-9 as required to realize a particularly desired embodiment.

Figure 5:
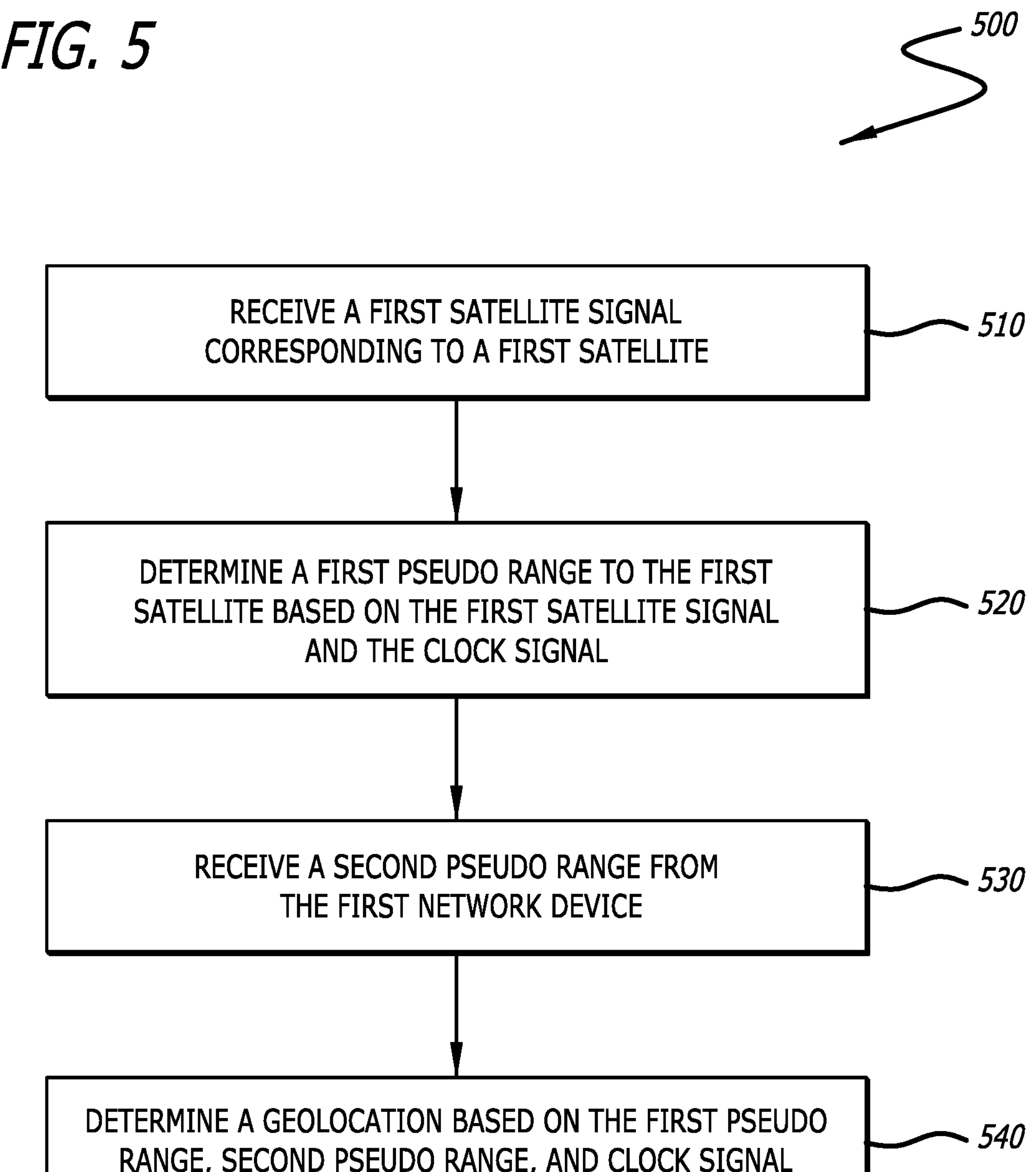
FIG. 5 is a flowchart depicting a process for determining a geolocation of a device, in accordance with various embodiments of the disclosure.

Referring now to FIG. 5, a flowchart depicting a process 500 for determining the geolocation of the device, in accordance with various embodiments of the disclosure is shown. In many embodiments, the process 500 can receive a first satellite signal corresponding to a first satellite (block 510). In some embodiments, the process 500 can be implemented in the reference AP. In certain embodiments, the reference AP may receive the GNSS data from the first satellite.

In a number of embodiments, the process 500 can determine a first pseudo range of the reference AP to the first satellite based on the first satellite signal and the clock signal (block 520). In some embodiments, the first satellite signal may include the GNSS data corresponding to the first satellite. In certain embodiments, the first satellite signal may include the GNSS data, such as a first pseudo random code, navigation data, a first satellite identifier of the first satellite, almanac data, or a first ephemeris data corresponding to the first satellite. In some more embodiments, the process 500 can identify the first satellite based on the first satellite identifier and can determine a location of the first satellite based on the first ephemeris data. In numerous embodiments, the process 500 can store the GNSS data corresponding to the first satellite in the memory of the reference AP. In many further embodiments, since the reference AP receives the first satellite signal after a certain amount of delay, the process 500 can determine a first pseudo range of the reference AP from the first satellite. In still more embodiments, the process 500 may determine the first pseudo range based on a speed of light and a difference between a time of transmission of the first satellite signal by the first satellite and a time of reception of the first satellite signal by the reference AP.

In various embodiments, the process 500 can receive a second pseudo range from a first network device (block 530). In some embodiments, the first network device may be the AP connected to the reference AP. In certain embodiments, the AP may receive a second satellite signal from a second satellite. In more embodiments, the second satellite signal can include the GNSS data of the second satellite. In some more embodiment, the AP may determine the second pseudo range of the AP from the second satellite. In numerous embodiments, the second satellite may not be visible to the reference AP.

In additional embodiments, the process 500 may determine the geolocation based on the first pseudo range, the second pseudo range, and the clock signal (block 540). In some embodiments, the reference AP and the AP can be present in the same synchronized mesh network, and hence, the geolocation of the reference AP and the AP may be the same. In certain embodiments, the reference AP may receive multiple pseudo ranges from the connected APs. In some more embodiments, the AP can utilize the reference clock signal for determining the geolocation. In numerous embodiments, the reference AP can determine the geolocation of the mesh network, including the reference AP and the connected APs, based at least on the first pseudo range and the second pseudo range.

Although a specific embodiment for determining the geolocation of the device for carrying out the various steps, processes, methods, and operations described herein is discussed with respect to FIG. 5, any of a variety of systems and/or processes may be utilized in accordance with embodiments of the disclosure. In many non-limiting examples, the process 500 can aggregate the GNSS data received from multiple satellites by multiple APs in the synchronized mesh network to determine the geolocation of the APs based on the aggregated GNSS data. The elements depicted in FIG. 5 may also be interchangeable with other elements of FIGS. 1-4 and 6-9 as required to realize a particularly desired embodiment.

Referring now to FIG. 6, a process 600 for detecting one or more ambient events and generating an event detection signal, in accordance with various embodiments of the disclosure is shown. In many embodiments, the process 600 may detect a first ambient interference event occurring at a first time instant (block 610). In some embodiments, a first AP may send a first frame to a second AP and a third AP. In certain embodiments, the second AP and the third AP can receive the first frame and observe a channel state information (CSI) carried at a physical layer by the first frame. In more embodiments, one or more ambient interference events can occur that may affect transmission of signals between the first through third APs.

In a number of embodiments, the process 600 can determine a first change in a signal strength corresponding to the first ambient interference event (block 620). In some embodiments, the first ambient interference event may cause a peak or a trough in a CSI amplitude of the received first frame. In certain embodiments, the second AP and the third AP can detect the peak or trough in the first frame and record the time of arrival of the first frame and the time of peaks or troughs in the first frame. In an embodiment, the peak or trough in the first frame may represent the aforementioned first change in the signal strength corresponding to the first ambient interference event.

In various embodiments, the process 600 may detect a second ambient interference event occurring at a second time instant (block 630). In some embodiments, the first AP may send a second frame to the second AP and the third AP. In certain embodiments, the second AP and the third AP can receive the second frame and observe the CSI carried at the physical layer by the second frame.

In additional embodiments, the process 600 can determine a second change in the signal strength corresponding to the second ambient interference event (block 640). In some embodiments, the second ambient interference event may cause a peak or a trough in the CSI amplitude of the received second frame. In certain embodiments, the second AP and the third AP can detect the peak or trough in the second frame and record the time of arrival of the second frame and the time of peaks or troughs in the second frame. In an embodiment, the peak or trough in the second frame may represent the aforementioned second change in the signal strength corresponding to the second ambient interference event.

In further embodiments, the process 600 may generate an event detection signal indicative of the first ambient interference event and the second ambient interference event (block 650). In some embodiments, the first AP can generate the event detection signal and transmit the event detection signal to the second AP and the third AP. In certain embodiments, the event detection signal may be indicative of a plurality of ambient interference events including the first ambient interference event and the second ambient interference event.

Although a specific embodiment for detecting one or more ambient events and generating the event detection signal for carrying out the various steps, processes, methods, and operations described herein is discussed with respect to FIG. 6, any of a variety of systems and/or processes may be utilized in accordance with embodiments of the disclosure. In many non-limiting examples, the process 600 can detect ambient interference events that affect CSI and transmit information about time and effect of the ambient interference events. The elements depicted in FIG. 6 may also be interchangeable with other elements of FIGS. 1-5 and 7-9 as required to realize a particularly desired embodiment.

Referring to FIG. 7, a flowchart depicting a process 700 for determining a clock drift, in accordance with various embodiments of the disclosure is shown. In many embodiments, the process 700 may receive the event detection signal indicative of the first ambient interference event and the second ambient interference event (block 710). In some embodiments, the event detection signal may include the first frame corresponding to the first ambient interference event and the second frame corresponding to the second ambient interference event. In certain embodiments, the first ambient interference event and the second ambient interference event occur at the first time instant and the second time instant, respectively.

In a number of embodiments, the process 700 may determine the first change in signal strength corresponding to the first ambient interference event occurring at the first time instant based on the event detection signal (block 720). In some embodiments, the first ambient interference event may cause the peak or trough in the CSI amplitude of the first frame. In certain embodiments, the process 700 can detect the peak or trough in the first frame and record the time of arrival of the first frame and the time of peaks or troughs in the first frame.

In various embodiments, the process 700 can determine the second change in signal strength corresponding to the second ambient interference event occurring the second time instant, based on the event detection signal (block 730). In some embodiments, the second ambient interference event may cause the peak or trough in the CSI amplitude of the second frame. In certain embodiments, the process 700 can detect the peak or trough in the second frame and record the time of arrival of the second frame and the time of peaks or troughs in the second frame.

In additional embodiments, the process 700 may determine the difference between the first time instant and the second time instant (block 740). In some embodiments, since the first ambient interference event and the second ambient interference event occur at two fixed points in time, positions of the peaks or troughs caused by the first ambient interference event and the second ambient interference in the first frame and the second frame respectively should also be at the two fixed points in time. In certain embodiments, the process 700 can measure passage of time between the first ambient interference event and the second ambient interference event based on the clock signal.

In further embodiments, the process 700 can determine the clock drift based on the difference (block 750). In some embodiments, the process 700 may observe a time interval between the first ambient interference event and the second ambient interference event based on the clock signal and compare the time interval with the time difference determined based on the event detection signal. In certain embodiments, the process 700 can measure the clock drift based on the comparison. In more embodiments, the process 700 may calibrate the clock signal based on the clock drift.

Although a specific embodiment for determining the clock drift for carrying out the various steps, processes, methods, and operations described herein is discussed with respect to FIG. 7, any of a variety of systems and/or processes may be utilized in accordance with embodiments of the disclosure. In many non-limiting examples, the process 700 can determine the clock drift and calibrate the clock signal based on changes in CSI parameters of the signals. The elements depicted in FIG. 7 may also be interchangeable with other elements of FIGS. 1-6 and 8-9 as required to realize a particularly desired embodiment.

Figure 8:
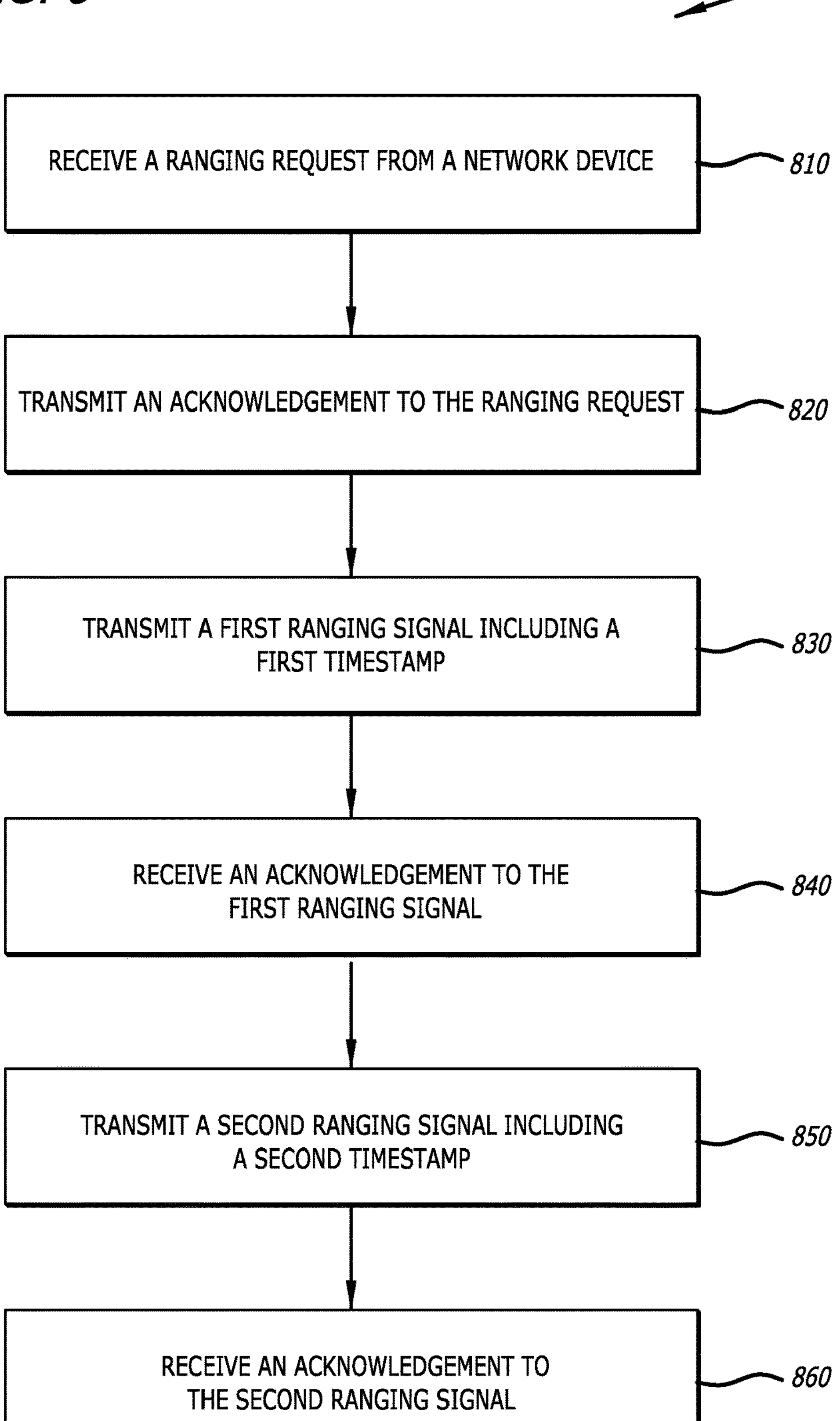
FIG. 8 is a flowchart depicting a process for a ranging procedure, in accordance with various embodiments of the disclosure.

Referring now to FIG. 8, a flowchart depicting a process 800 for the ranging procedure, in accordance with various embodiments of the disclosure is shown. In many embodiments, the process 800 can receive a ranging request from the network device (block 810). In some embodiments, the ranging request may be the FTM, UWB, or a similar ranging request. In certain embodiments, the process 800 can receive a plurality of ranging requests from a plurality of network devices.

In a number of embodiments, the process 800 may transmit an acknowledgement to the ranging requests (block 820). In some embodiments, the process 800 can transmit a plurality of acknowledgements in response to the plurality of ranging requests. In certain embodiments, the process 800 may distinguish between each of the ranging requests based on a code for identifying the corresponding network device.

In various embodiments, the process 800 can transmit the first ranging signal to the network device (block 830). In some embodiments, the first ranging signal may be transmitted by the process 800 at a time instant corresponding to the first time stamp. In certain embodiments, the process 800 can transmit time stamps in all frames transmitted to the network devices.

In additional embodiments, the process 800 may receive an acknowledgement signal for the first ranging signal from the network device (block 840). In some embodiments, the process 800 can receive the acknowledgement signal from the network device at a time instant corresponding to the second time stamp. In certain embodiments, a difference between the first time stamp and the second time stamp can be indicative of the time-of-flight corresponding to the network device.

In further embodiments, the process 800 can transmit a second ranging signal including the second time stamp (block 850). In some embodiments, the second ranging signal may include the first time stamp and the second time stamp. In certain embodiments, the network device can calculate the time-of-flight and the distance based on the first time stamp and the second time stamp.

In many more embodiments, the process 800 can receive the acknowledgement to the second ranging signal (block 860). In some embodiments, the process 800 may perform the ranging procedure in real-time when any network device triggers the ranging request. In certain embodiments, the network device can trigger the ranging request when the network device receives any GNSS data from any satellite. In more embodiments, the GNSS receiver may transmit pulses to a radio of the network device at predefined time intervals. In some more embodiments, the GNSS receiver may transmit pulses to the radio of the network device upon detecting one or more satellites. In numerous embodiments, the network device can trigger the ranging request at predefined time intervals.

Although a specific embodiment for ranging procedure for carrying out the various steps, processes, methods, and operations described herein is discussed with respect to FIG. 8, any of a variety of systems and/or processes may be utilized in accordance with embodiments of the disclosure. In many non-limiting examples, the process 800 may perform the FTM or UWB ranging procedure in real-time when any network device receives GNSS data from any satellite. The elements depicted in FIG. 8 may also be interchangeable with other elements of FIGS. 1-7 and 9 as required to realize a particularly desired embodiment.

Referring to FIG. 9, a conceptual block diagram of a device 900 suitable for configuration with a calibration logic in accordance with various embodiments of the disclosure is shown. The embodiment of the conceptual block diagram depicted in FIG. 9 can illustrate a conventional server computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 9 can also illustrate an access point, a switch, or a router in accordance with various embodiments of the disclosure. The device 900 may, in many non-limiting examples, correspond to physical devices or to virtual resources described herein.

In many embodiments, the device 900 may include an environment 902 such as a baseboard or "motherboard," in physical embodiments that can be configured as a printed circuit board with a multitude of components or devices connected by way of a system bus or other electrical communication paths. Conceptually, in virtualized embodiments, the environment 902 may be a virtual environment that encompasses and executes the remaining components and resources of the device 900. In more embodiments, one or more processors 904, such as, but not limited to, central processing units ("CPUs") can be configured to operate in conjunction with a chipset 906. The processor(s) 904 can be standard programmable CPUs that perform arithmetic and logical operations necessary for the operation of the device 900.

In a number of embodiments, the processor(s) 904 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 906 may provide an interface between the processor(s) 904 and the remainder of the components and devices within the environment 902. The chipset 906 can provide an interface to a random-access memory ("RAM") 908, which can be used as the main memory in the device 900 in some embodiments. The chipset 906 can further be configured to provide an interface to a computer-readable storage medium such as a read-only memory ("ROM") 910 or non-volatile RAM ("NVRAM") for storing basic routines that can help with various tasks such as, but not limited to, starting up the device 900 and/or transferring information between the various components and devices. The ROM 910 or NVRAM can also store other application components necessary for the operation of the device 900 in accordance with various embodiments described herein.

Additional embodiments of the device 900 can be configured to operate in a networked environment using logical connections to remote computing devices and computer systems through a network, such as the network 940. The chipset 906 can include functionality for providing network connectivity through a network interface card ("NIC") 912, which may comprise a gigabit Ethernet adapter or similar component. The NIC 912 can be capable of connecting the device 900 to other devices over the network 940. It is contemplated that multiple NICs 912 may be present in the device 900, connecting the device to other types of networks and remote systems.

In further embodiments, the device 900 can be connected to a storage 918 that provides non-volatile storage for data accessible by the device 900. The storage 918 can, for instance, store an operating system 920, applications 922, GNSS data 928 and Received Signal Strength Indicator (RSSI) data 930 which are described in greater detail below. The storage 918 can be connected to the environment 902 through a storage controller 914 connected to the chipset 906. In certain embodiments, the storage 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 900 can store data within the storage 918 by transforming the physical state of the physical storage units to reflect the information being stored. The specific transformation of physical state can depend on various factors. Examples of such factors can include, but are not limited to, the technology used to implement the physical storage units, whether the storage 918 is characterized as primary or secondary storage, and the like.

In many more embodiments, the device 900 can store information within the storage 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 900 can further read or access information from the storage 918 by detecting the physical states or characteristics of one or more particular locations within the physical storage units.

In addition to the storage 918 described above, the device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 900. In some examples, the operations performed by a cloud computing network, and or any components included therein, may be supported by one or more devices similar to device 900. Stated otherwise, some or all of the operations performed by the cloud computing network, and or any components included therein, may be performed by one or more devices 900 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 918 can store an operating system 920 utilized to control the operation of the device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 918 can store other system or application programs and data utilized by the device 900.

In many additional embodiments, the storage 918 or other computer-readable storage media is encoded with computer-executable instructions which, when loaded into the device 900, may transform it from a general-purpose computing system into a special-purpose computer capable of implementing the embodiments described herein. These computer-executable instructions may be stored as application 922 and transform the device 900 by specifying how the processor(s) 904 can transition between states, as described above. In some embodiments, the device 900 has access to computer-readable storage media storing computer-executable instructions which, when executed by the device 900, perform the various processes described above with regard to FIGS. 1-8. In certain embodiments, the device 900 can also include computer-readable storage media having instructions stored thereupon for performing any of the other computer-implemented operations described herein.

In many further embodiments, the device 900 may include a calibration logic 924. The calibration logic 924 can be configured to perform one or more of the various steps, processes, operations, and/or other methods that are described above. Often, the calibration logic 924 can be a set of instructions stored within a non-volatile memory that, when executed by the processor(s)/controller(s) 904 can carry out these steps, etc. In some embodiments, the calibration logic 924 may be a client application that resides on a network-connected device, such as, but not limited to, a server, switch, personal or mobile computing device in a single or distributed arrangement. In certain embodiments, the calibration logic 924 can calibrate a clock signal of the device 900.

In still many embodiments, the device 900 can include at least one GNSS receiver 917. In still further embodiments, the device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can be configured to provide output to a display, such as a computer monitor, a flat panel display, a digital projector, a printer, or other type of output device. Those skilled in the art will recognize that the device 900 might not include all of the components shown in FIG. 9 and can include other components that are not explicitly shown in FIG. 9 or might utilize an architecture completely different than that shown in FIG. 9.

In numerous embodiments, the storage 918 can include the RSSI data 930. The RSSI data 930 can include CSI corresponding to the wireless signals received by the device 900.

As described above, the device 900 may support a virtualization layer, such as one or more virtual resources executing on the device 900. In some examples, the virtualization layer may be supported by a hypervisor that provides one or more virtual machines running on the device 900 to perform functions described herein. The virtualization layer may generally support a virtual resource that performs at least a portion of the techniques described herein.

Finally, in numerous additional embodiments, data may be processed into a format usable by a machine-learning model 926 (e.g., feature vectors), and or other pre-processing techniques. The machine-learning ("ML") model 926 may be any type of ML model, such as supervised models, reinforcement models, and/or unsupervised models. The ML model 926 may include one or more of linear regression models, logistic regression models, decision trees, Naïve Bayes models, neural networks, k-means cluster models, random forest models, and/or other types of ML models 926.

The ML model(s) 926 can be configured to generate inferences to make predictions or draw conclusions from data. An inference can be considered the output of a process of applying a model to new data. This can occur by learning from at least the RSSI data 930 and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 926 may be generated by human/administrator verifications or may compare predicted outcomes with actual outcomes.

Although a specific embodiment for a device suitable for configuration with a calibration logic for carrying out the various steps, processes, methods, and operations described herein is discussed with respect to FIG. 9, any of a variety of systems and/or processes may be utilized in accordance with embodiments of the disclosure. For example, the device may be in a virtual environment such as a cloud-based network administration suite, or it may be distributed across a variety of network devices or APs. The elements depicted in FIG. 9 may also be interchangeable with other elements of FIGS. 1-8 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:

a processor;

a memory communicatively coupled to the processor; and a calibration logic, configured to:

transmit a ranging request;

receive a first timestamp, a second timestamp, and a timer value indicative of a time for a next frame exchange from a first network device in response to the ranging request;

determine a clock offset based on a difference between the first timestamp and the second timestamp;

determine a clock drift based on the clock offset and the timer value; and calibrate a local clock signal in real-time based on the clock drift and the clock offset.

2. The device of claim 1, further comprising at least one global navigation satellite system (GNSS) receiver configured to receive a first satellite signal corresponding to a first satellite.

3. The device of claim 2, wherein the calibration logic is further configured to:

determine a first pseudo range to the first satellite based on the first satellite signal and the clock signal; and determine a geolocation of the device based on the first pseudo range.

4. The device of claim 3, wherein the calibration logic is further configured to:

receive a second pseudo range from the first network device; and determine a geolocation of the first network device based on the second pseudo range and the clock signal.

5. The device of claim 1, wherein the calibration logic is further configured to:

detect a first ambient interference event occurring at a first time instant;

determine a first change in a signal strength corresponding to the first ambient interference event;

detect a second ambient interference event occurring at a second time instant;

determine a second change in the signal strength corresponding to the second ambient interference event; and generate an event detection signal indicative of the first ambient interference event and the second ambient interference event.

6. The device of claim 1, wherein the calibration logic is further configured to:

receive an event detection signal indicative of a first ambient interference event and a second ambient interference event;

determine a first change in signal strength corresponding to the first ambient interference event occurring at a first time instant based on the event detection signal;

determine a second change in signal strength corresponding to the second ambient interference event occurring at a second time instant based on the event detection signal; and determine the clock drift based on a difference between the first time instant and the second time instant.

7. The device of claim 1, wherein the ranging request includes at least one of: a fine time measurement (FTM) ranging request or an ultra-wide band (UWB) ranging request.

8. A device comprising:

a processor;

a memory communicatively coupled to the processor; and a calibration logic, configured to:

receive a plurality of ranging requests from a plurality of network devices; and transmit a plurality of responses to the plurality of network devices, each response including a timer value indicative of a time for a next frame exchange wherein the plurality of network devices synchronizes corresponding clock signals with a reference local clock signal of the device in real-time based on corresponding responses.

9. The device of claim 8, wherein the calibration logic is further configured to:

receive one or more pseudo ranges from the plurality of network devices; and determine a geolocation of the plurality of network devices based on the one or more pseudo ranges and the reference clock signal.

10. The device of claim 9, further comprising at least one global navigation satellite system (GNSS) receiver configured to receive a first satellite signal corresponding to a first satellite.

11. The device of claim 10, wherein the calibration logic is further configured to:

determine a first pseudo range to the first satellite based on the first satellite signal; and determine a geolocation of the device based on the first pseudo range.

12. The device of claim 11, wherein each response includes a first timestamp, a second timestamp, and a timer value.

13. The device of claim 12, wherein each network device of the plurality of network devices determines a clock offset based on a difference between the first timestamp and the second timestamp, and a clock drift based on the clock offset and the timer value.

14. The device of claim 13, wherein each network device of the plurality of network devices synchronizes corresponding clock signal with the reference clock signal of the device based on the clock drift and the clock offset.

15. The device of claim 9, wherein each ranging request includes at least one of: a fine time measurement (FTM) ranging request or an ultra-wide band (UWB) ranging request.

16. The device of claim 9, wherein the calibration logic is further configured to:

detect a first ambient interference event occurring at a first time instant;

determine a first change in a signal strength corresponding to the first ambient interference event;

detect a second ambient interference event occurring at a second time instant;

determine a second change in the signal strength corresponding to the second ambient interference event; and generate an event detection signal indicative of the first ambient interference event and the second ambient interference event.

17. The device of claim 16, wherein each network device of the plurality of network devices receives the event detection signal and synchronizes corresponding clock signal with the reference clock signal based on the event detection signal.

18. A method comprising:

initiating a ranging procedure;

receiving a first timestamp, a second timestamp, and a timer value indicative of a time for a next frame exchange from a first network device in response to a ranging procedure;

determining a clock offset based on a difference between the first timestamp and the second timestamp;

determining a clock drift based on the clock offset and the timer value; and calibrating a local clock signal in real-time based on the clock drift and the clock offset.

19. The method of claim 18, further comprising:

receiving a first satellite signal corresponding to a first satellite;

determining a first pseudo range to the first satellite based on the first satellite signal and the clock signal; and determining a geolocation based on the first pseudo range and the clock signal.

20. The method of claim 18, further comprising:

receiving an event detection signal indicative of a first ambient interference event and a second ambient interface event; and calibrating the clock signal based on the event detection signal.

* * * * *